United States Patent
Tao et al.

(10) Patent No.: US 8,644,624 B2
(45) Date of Patent: Feb. 4, 2014

(54) SYSTEM AND METHOD FOR INDOOR-OUTDOOR SCENE CLASSIFICATION

(75) Inventors: Li Tao, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 816 days.

(21) Appl. No.: 12/510,908

(22) Filed: Jul. 28, 2009

(65) Prior Publication Data
US 2011/0026840 A1 Feb. 3, 2011

(51) Int. Cl.
G06K 9/62 (2006.01)
G06K 9/68 (2006.01)
G06K 9/70 (2006.01)
G06K 9/74 (2006.01)
G06K 9/00 (2006.01)

(52) U.S. Cl.
USPC ........... 382/224; 382/155; 382/156; 382/157; 382/158; 382/159; 382/225; 382/226; 382/227; 382/228; 382/229

(58) Field of Classification Search
None
See application file for complete search history.

(56) References Cited

U.S. PATENT DOCUMENTS

| | | | |
|---|---|---|---|
| 7,555,165 B2* | 6/2009 | Luo et al. | 382/224 |
| 8,094,948 B2* | 1/2012 | Jain et al. | 382/225 |
| 2004/0001631 A1* | 1/2004 | Camara et al. | 382/224 |
| 2006/0274949 A1* | 12/2006 | Gallagher et al. | 382/228 |
| 2009/0208106 A1* | 8/2009 | Dunlop et al. | 382/173 |
| 2010/0124378 A1* | 5/2010 | Das et al. | 382/225 |

OTHER PUBLICATIONS

Serrano et al., "A computationally efficient approach to indoor/outdoor scene classification", Pattern Recognition, 2002. Proceedings. 16th International Conference on vol. 4; pp. 146-149.*

Vailaya et al., "On image classification: city vs. landscape", Content-Based Access of Image and Video Libraries, 1998. Proceedings. IEEE Workshop on; pp. 3-8.*

* cited by examiner

*Primary Examiner* — Matthew Bella
*Assistant Examiner* — Thomas Conway
(74) *Attorney, Agent, or Firm* — IP Investment Law Group (57) ABSTRACT

Embodiments include a scene classification system and method. In one embodiment, a method includes forming a first plurality of image features from an input image, processing the first plurality of image features in the first scene classifier.

14 Claims, 9 Drawing Sheets

SYSTEM AND METHOD FOR INDOOR-OUTDOOR SCENE CLASSIFICATION

BACKGROUND OF THE INVENTION

1. Field of the Invention

This application relates to scene classification based on image processing and pattern recognition, and more particularly to classifying a digital image as an indoor or outdoor scene.

2. Description of the Related Technology

Scene classification is useful in both image processing and computer vision. For example, it can be applied in automatic color correction (white balance), scene recognition as well as content based image indexing, enquiry and retrieval. Scene classification also has applications in scene depth estimation which is useful in converting two-dimensional ("2D") images to three-dimensional ("3D") images. Accordingly, a need exists for methods and devices that are designed to classify images as indoor or outdoor scenes.

SUMMARY OF CERTAIN INVENTIVE ASPECTS

The system, method, and device of the invention each have several aspects, no single one of which is solely responsible for its desirable attributes. Without limiting the scope of this invention, its more prominent features will now be discussed. After considering this discussion, and particularly after reading the section entitled "Detailed Description of Certain Embodiments" one will understand how this invention provides features that include image classification devices and methods using numerous but relatively less complex classifiers to provide robust performance. New image characteristics/features are disclosed that can enhance the discrimination capability of weak classifiers while keeping down the complexity of the classification task. In addition, multiple (relatively) weak classifiers, based on various image characteristics/features, can be used in combination to provide robust performance. Such embodiments may be implemented without unnecessarily complex image processing techniques, reducing the amount of computation power required, and thus making such processing suitable for hardware implementation in practical systems.

In one embodiment, a method of classifying a scene depicted in an image includes receiving an input image at a first scene classifier, forming a first plurality of image features (e.g., image characteristics which are generally represented in vectors, called feature vectors) from the input image, processing the first plurality of image features in the first scene classifier using a set of first sub-classifiers, each first sub-classifier determining first classification data for one of the first plurality of image features, classifying the image, in a first final classifier in the first scene classifier, as an indoor scene or an outdoor scene based on the first classification data determined by the set of first sub-classifiers. If the image is classified as an outdoor scene, forming a second plurality of image features from the input image in a second scene classifier, processing each of the second plurality of image features in the second scene classifier using a set of second sub-classifiers, each second sub-classifier determining second classification data for one of the second plurality of image features, and classifying the image, in a second final classifier in the second scene classifier, as an outdoor urban scene or an outdoor natural scene based on the second classification data determined by the set of second sub-classifiers. The first plurality of image features and the second plurality of image features can each comprise at least three types of image features. In one aspect, the first plurality of image features can comprise the same or different set of image features as the second plurality of image features. In some embodiments, the plurality of image features are each based on feature information, contained in the pixels of the input image, comprising at least one of color, entropy, edge, and discrete cosine transform (DCT) information. In some embodiments, forming a second plurality of image features from the input image in a second scene classifier comprises obtaining the first plurality of image features from the first scene classifier.

In some embodiments, method of classifying a scene includes forming a first image feature based on calculating an average u,v color value of each of a plurality of regions of the input image, forming a second image feature based on calculating an average hue value, in HSV color space, of each of a plurality of regions of the input image, forming a third image feature based on calculating a 2D DCT coefficient histogram having bins corresponding to a plurality of regions of the absolute DCT coefficient image, wherein the value/count of each bin in the 2D DCT coefficient histogram is the average of DCT coefficients calculated from the absolute values of the DCT coefficients within each of the plurality of regions, forming a fourth image feature based on dividing the intensity component of the input image into a plurality of regions, calculating entropy of the intensity component of the input image in each of the plurality of regions, and forming a 1D entropy histogram having a plurality of bins, each bin having a value indicating the number of regions within a certain range of entropy, forming a fifth image feature based on calculating the entropy and the average u,v color values of each of a plurality of regions of the input image, and correlating the averaged u,v (color information) with the entropy in a 2D histogram, forming a sixth image feature based on filtering the intensity component of the input image to determine edge orientations, and forming a 1D histogram of edge orientations wherein each bin of the 1D histogram indicates the number of pixels exhibiting an edge orientation which falls within a certain range, and forming a seventh image feature based on spatially filtering the intensity component of the input image in an x-direction and a y-direction to determine edge orientations, and calculating an entropy of edge orientation based on the x-direction and the y-direction intensity gradients.

In another embodiment, a computer-program product for determining a joint user profile for personalizing a multimedia experience, the product comprising a computer-readable medium having stored thereon codes executable by at least one processor to receive an input image at a first scene classifier, form a first plurality of image features from the input image, process the first plurality of image features in the first scene classifier using a set of first sub-classifiers, each first sub-classifier determining first classification data for one of the first plurality of image features, classify the image, in a first final classifier in the first scene classifier, as an indoor scene or an outdoor scene based on the first classification data determined by the set of first sub-classifiers, if the image is classified as an outdoor scene, form a second plurality of image features from the input image in a second scene classifier, process each of the second plurality of image features in the second scene classifier using a set of second sub-classifiers, each second sub-classifier determining second classification data for one of the second plurality of image features, and classify the image, in a second final classifier in the second scene classifier, as an outdoor urban scene or an outdoor natural scene based on the second classification data determined by the set of second sub-classifiers.

In another embodiment, a scene classification system includes a first scene classifier comprising a first stage having a plurality of first sub-classifiers each configured to receive an input image, generate an image feature from the input image, classify the input image using the image feature, and provide first classification data, a second stage having a final classifier configured to receive the first classification data from the plurality of first sub-classifiers and determine if a scene depicted in the input image is an indoor scene or an outdoor scene, and a second scene classifier comprising a first stage having a plurality of second sub-classifiers each configured to receive the input image, generate an image feature from the input image, classify the input image using the image feature, and provide second classification data, and a second stage having a final classifier configured to receive the second classification data from the plurality of second sub-classifiers and determine if an outdoor scene depicted in the input image is an urban outdoor scene or a natural outdoor scene.

In another embodiment a system for scene classification includes means for receiving an input image at a first scene classifier, means for forming a first plurality of image features from the input image, means for processing the first plurality of image features in the first scene classifier using a set of first sub-classifiers, each first sub-classifier determining first classification data for one of the first plurality of image features, means for classifying the image, in a final classifier in the first scene classifier, as an indoor scene or an outdoor scene based on the first classification data determined by the set of first sub-classifiers, if the image is classified as an outdoor scene, means for forming a second plurality of image features from the input image in a second scene classifier, means for processing each of the second plurality of image features in the second scene classifier using a set of second sub-classifiers, each second sub-classifier determining second classification data for one of the second plurality of image features, and means for classifying the image, in a second final classifier in the second scene classifier, as an outdoor urban scene or an outdoor natural scene based on the second classification data determined by the set of second sub-classifiers.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Scene classification is useful in both image processing and computer vision. For example, scene classification can be used in automatic color correction (white balance), scene recognition as well as content based image indexing, enquiry and retrieval. In addition, scene classification is a critical step for scene depth estimation which can be used when converting two-dimensional ("2D") scenes to three-dimensional ("3D") scenes. Because indoor scenes generally have distinctive depth ranges from those in outdoor scenes, correctly classifying images as an indoor scene or an outdoor scene can allow a more accurate depth map of the scene to be generated and thus facilitate more accurate 2D to 3D image conversion processing. In some embodiments, a scene classification system includes a first scene classifier that determines whether an image is an indoor scene or an outdoor scene, and a second scene classifier that determines if an outdoor scene is an urban scene or a natural scene. Each scene classifier includes a first stage and a second stage. In one embodiment, the first stage of a scene classifier can include two or more subclassifiers that are each based on one or two image features which can depict certain differences between indoor and outdoor scenes in terms of the images' statistical properties relating to, for example, color, entropy, edge, or discrete cosine transform ("DCT"). The use of multiple sub-classifiers in the first stage allows for simpler and faster processing on more practical computing systems, and such configurations may be more suitable for hardware implementations. The second stage of the scene classifier performs scene classification in a final classifier using the output from the first stage sub-classifiers as input. Such scene classification systems can be implemented in various components in a video chain that presents video from a content provider to a viewer. For example, in various embodiments, a television set, a cable television access box, a television satellite access box, a separate video component, or digital camera/camcorder could all incorporate the scene classification methods and systems described herein.

Figure 1:
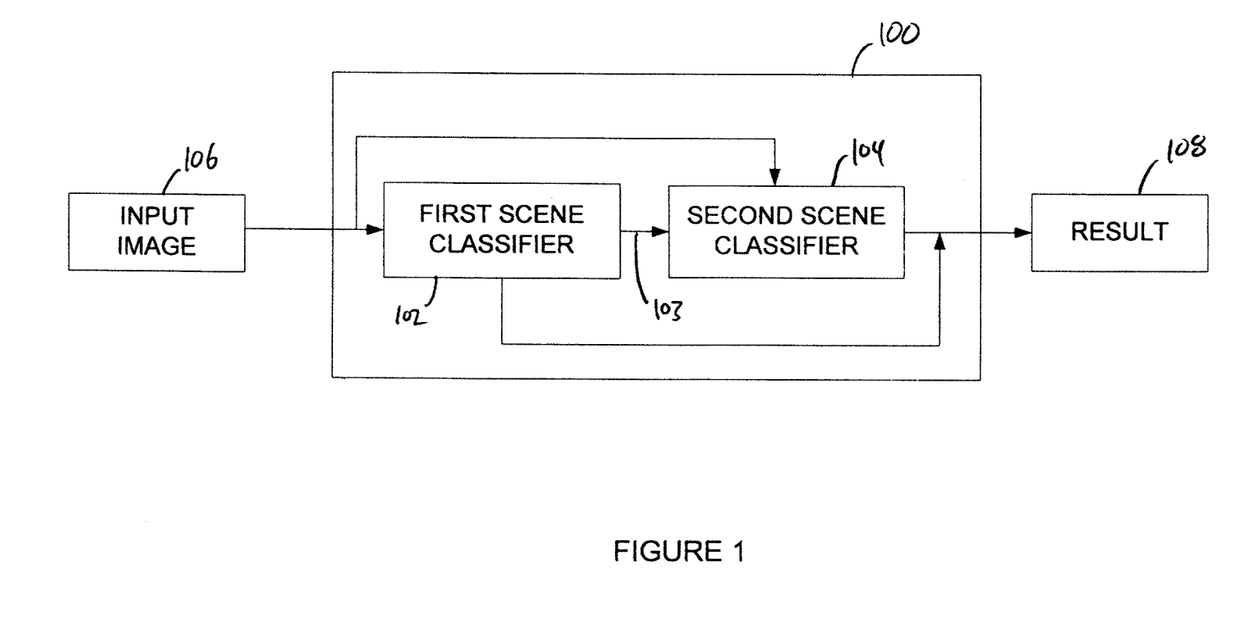
FIG. 1 is a block diagram illustrating one embodiment of a scene classification system.

FIG. 1 is a block diagram illustrating a scene classification system 100, according to one embodiment. The scene classification system 100 is configured to receive an input image 106 and classify the type of scene depicted by the input image 106. The scene classification system 100 includes a first scene classifier 102 and a second scene classifier 104. The first scene classifier 102 is configured to classify the input image 106 using certain predetermined computing/processing procedures relating to one or more image features based on information contained in the input image relating to color, entropy, edge, and/or DCT information. The classification result 108 from the first scene classifier 102 can be output if no further classification of the input image 106 is desired. The second scene classifier 104 is configured to receive the input image 106 and information 103 from the first scene classifier 102, further classify the input image 106, and output a classification result 108, if additional classification is desired.

Figure 2:
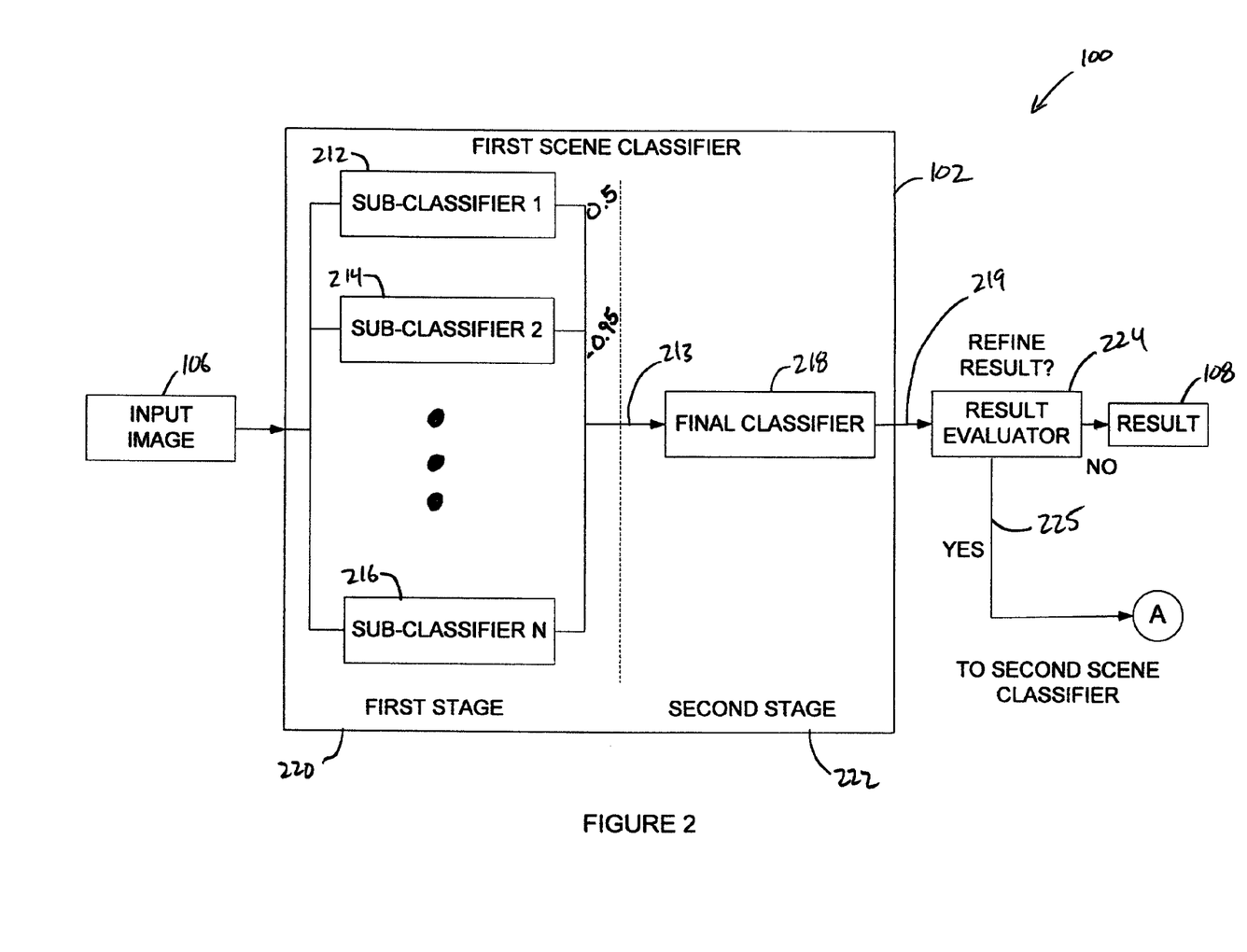
FIG. 2 is a block diagram illustrating one embodiment of a first scene classifier.

FIG. 2 illustrates a portion of the scene classification system 100 shown in FIG. 1, including certain components of the first scene classifier 102, according to one embodiment. The first scene classifier 102 can include a first stage 220 and a second stage 222. The first stage 220 can include two or more sub-classifiers 212, 214, 216. FIG. 2 illustrates three sub-classifiers, ("sub-classifier 1," "sub-classifier 2," and "sub-classifier N") to represent such configurations with two or more sub-classifiers. In some examples, the first stage 220 can include five or seven (or more) sub-classifiers. The multiple sub-classifiers can be configured for parallel processing to minimize processing time. The sub-classifiers can be configured in parallel using hardware implementations, or the sub-classifiers can be configured to run in parallel on two or more processors. In some embodiments, two or more of the sub classifiers can be configured to run in parallel in a software implementation of the sub-classifiers 212, 214, 216. In some embodiments, the sub-classifiers can be configured using a combination of hardware and software implementations.

Still referring to FIG. 2, the sub-classifiers 212, 214, 216 can be configured to process information derived from the input image 106 independently. The derived information from the input image 106 is referred to as an image feature (generally represented as a feature vector). An image feature includes information, which is derived from the pixel values of the input image 106, relating to color, entropy, edge, and/or DCT information. An image feature can be formed with the information relating to one of color, entropy, edge or DCT information, or a "composite" image feature may be formed by information relating to two or more of color, entropy, edge, or DCT information. An image feature may contain such information as represented by a histogram, as described herein below. One of the advantages of the two-stage structure of scene classifier is low dimensionality of the feature vectors which need to be processed by the sub-classifiers. If only a single classifier is used, the number of dimensions of the feature vector may be too large to be readily handled in practical computing systems, especially for a sub-classifier hardware implementation. In some embodiments, each sub-classifier processes one image feature, and one image feature (including "composite" image feature) can be processed by one sub-classifier only. Another advantage of the two-stage multi-sub-classifier structure is the flexibility of training and tuning each sub-classifier. Each of them can be individually and optimally trained and tuned.

The classification results 213 from all the sub-classifiers 212, 214, 216 in the first stage 220 are provided to the second stage 222, also shown in FIG. 2. A final classifier 218 in the second stage 222 is configured to receive the results 213 from all of the sub-classifiers 212, 214, 216 and produces a final classification result 219. A result evaluator 224 receives the classification result 219 and determines if further classification is required. The result evaluator 224 can be implemented in the second stage 222 of the first scene classifier 102, or it can be part of the second scene classifier 104. In some embodiments, the result evaluator 224 is a separate component of the scene classification system 100 and not a part of either the first scene classifier 102 or second scene classifier 104. If further classification of the scene depicted in the input image 106 is not desired, the result evaluator 224 outputs the result 108. Alternatively, if further classification of the input image 106 is desired the result evaluator provides an output 225 to the second scene classifier 104 (represented by the circle "A") indicating the need for further classification. The image features obtained in the first scene classifier may be passed to the second scene classifier.

Figure 3:
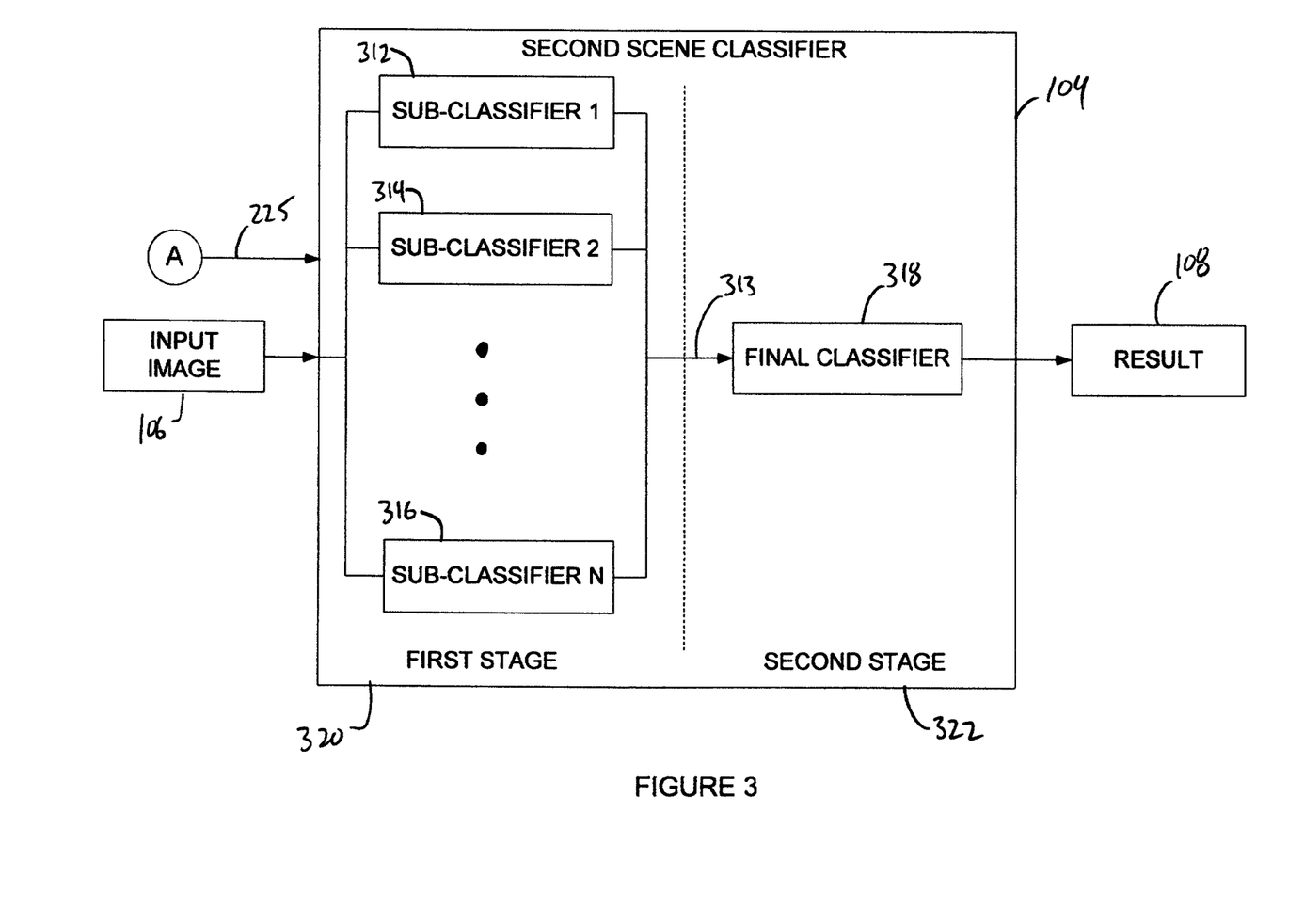
FIG. 3 is a block diagram illustrating one embodiment of a second scene classifier.

FIG. 3 illustrates the second scene classifier 104, according to one embodiment. The second scene classifier also includes a first stage 320 and a second stage 322. Two or more sub-classifiers, depicted by sub-classifiers 312, 314, 316 in the first stage 320 receive the input image 106. The results 313 from the sub-classifiers 312, 314, 316 are provided to a final classifier 318 in the second stage 322, which classifies the scene based on the results 313 from the sub-classifiers 312, 314, 316 and outputs a scene classification result 108.

Each sub-classifier of the first and second scene classifier can be implemented using various pattern recognition techniques, such as K-nearest neighbor method or artificial neural network. Neural networks can be used to classify the feature vectors in any of the first and second stages in the first and second scene classifier, and can be especially useful because they can model complex statistical data even though no prior information is available characterizing the statistical properties of the input image feature data. Using the classification techniques described herein, simple image characteristics/features, which still exhibit certain discriminative capabilities, are implemented as weak classifiers that require less complex and less amount of image processing. Multiple weak sub-classifiers can be used jointly to make a strong and fast classifier that is still computationally more efficient when compared either to a single classifier that is large and complex, or to a classifier composed of a fewer number of sub-classifiers which are stronger but much more complex. Composite/correlated feature vectors, which are based on two simple image features, exhibit enhanced classification performance while minimizing computational cost for training & classification due to the reduction of number of dimensions of multiple independent features. Furthermore, whole image classification (compared to sub-block processing) using multiple sub-classifiers can help to reduce the complexity of the problem for faster training and classification process with no significant reduction in performance.

Illustrative Embodiment for Classifying Indoor and Outdoor Scenes

Figure 4:
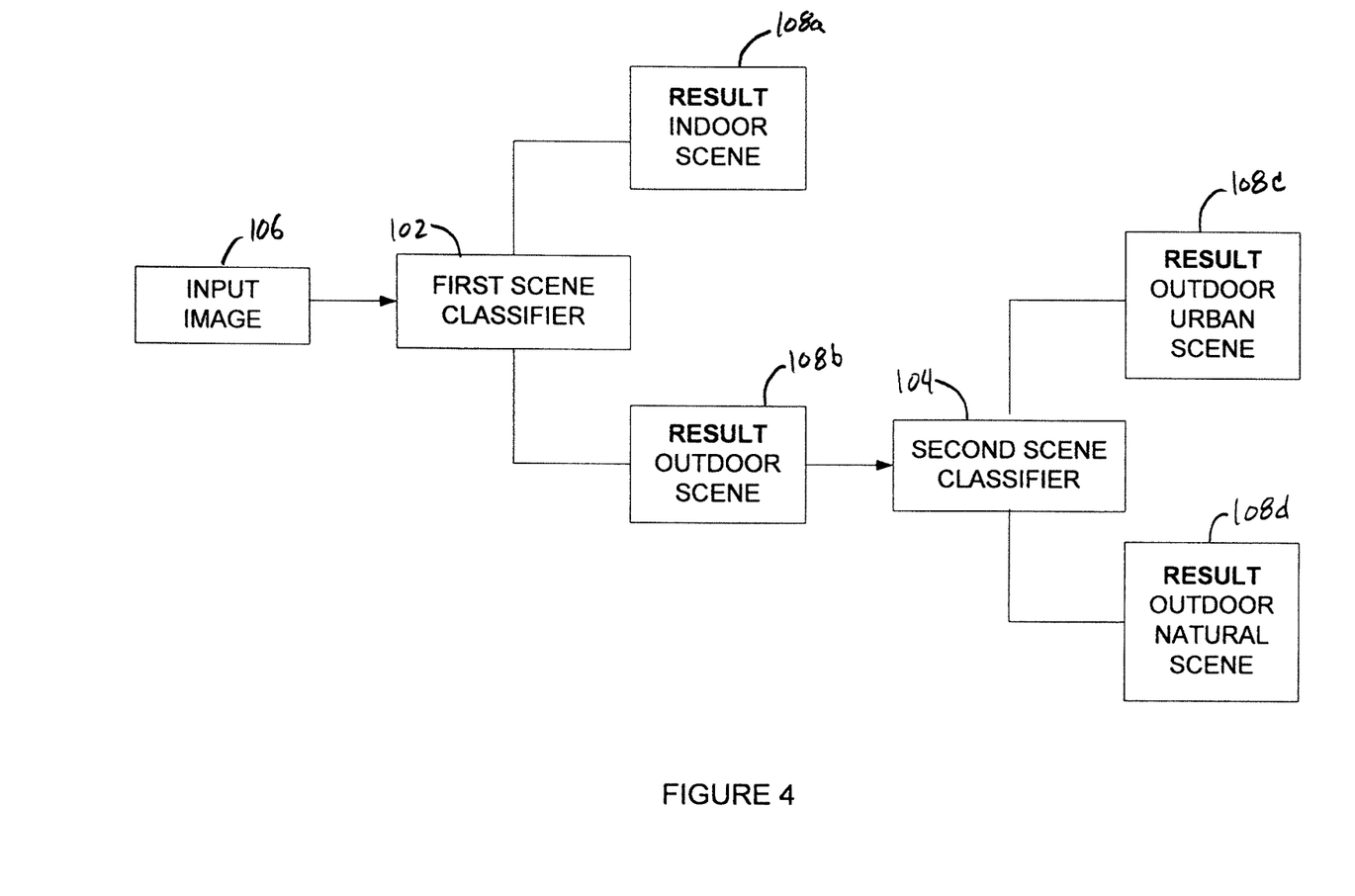
FIG. 4 is a block diagram illustrating the functional flow a scene classification system that is used to classify images as one of three types of images, indoor, outdoor urban, or outdoor natural.

FIG. 4 illustrates a block diagram of an embodiment of a scene classification system 100 that classifies images as an indoor scene or an outdoor scene, according to one embodiment. This can be useful for scene depth estimation when converting 2D scenes to 3D scenes. The first scene classifier 102 is configured to receive the input image 106 and generate certain feature vectors from the input image 106 and use a plurality of sub-classifiers 212, 214, 216 and a final classifier 218 (FIG. 2) to classify the input image 106. The first scene classifier 102 produces a classification result of an indoor scene 108a or an outdoor scene 108b. If the input image is classified as an outdoor scene 108b, the second scene classifier 104 further classifies the input image 106 as either an outdoor urban scene 108c or an outdoor natural scene 108d.

In the embodiment illustrated in FIG. 4, each sub-classifier in the first stage of the first scene classifier 102 and the second scene classifier 104 classifies the input image 106 based on one image feature which can exhibit certain differences between indoor and outdoor images in terms of the feature's statistical properties Keep the following (for example, as discussed below in reference to Sub-classifiers 1-7). to achieve hardware implementation in practical systems, low-complexity image features are preferred. As described in this embodiment, a "weak" sub-classifier is trained based on one type of image feature. Accordingly, multiple sub-classifiers are employed to work on the same image to obtain good performance, and multiple image features are used by multiple sub-classifiers respectively. In the embodiment illustrated in FIG. 4, four types of image information are used to construct the feature vectors that are processed by the sub-classifiers: color entropy, edge orientation and DCT coefficients. Feature vectors representing one or more of these image information (features) can be computed by relatively small computing systems, for example, computing systems that may be included in digital TV systems. According to one embodiment, seven sub-classifiers that are designed using color entropy, edge orientation, and/or DCT coefficients, are described below. Two or more of these sub-classifiers can be included in the first and second scene classifier. In one embodiment for an indoor-outdoor scene classification system, all seven of the sub-classifiers are included in both the first scene classifier 102 and the second scene classifier 104. For ease of reference these sub-classifiers are referred to as sub-classifier 1, sub-classifier 2, etc., and are described in no particular order.

In some embodiments, one or more of the sub-classifiers can be the same for both the first and second scene classifiers, for example, using one or more of the same image features, and each implemented using a neural network. In some embodiments, even though the image features may be the same, the neural network node/neuron "weights" and "biases" assigned to each sub-classifier may be different between the first and second scene classifiers (further illustrated in FIGS. 7-9). For example, the weights and biases for the first set of sub-classifiers which are used to determine whether a scene is an indoor scene or an outdoor scene may be different for the second set of sub-classifiers that are determining if the outdoor scene is an urban scene or a natural scene.

In some embodiments, each scene classifier may not use all seven sub-classifiers. Selecting which of the one or more sub-classifiers to use can be determined by the training experiments and other issues, for example, algorithm or coding complexity. In some embodiments, the difference between the sub-classifiers used in the first and second scene classifiers may only be that different parameters will be set by the sub-classifier training (if sub-classifiers possess the same configurations/structures in both scene classifiers) because different training data will be used. The inputs to the final classifier (second stage) are outputs from the sub-classifiers (first stage), which are classification results (usually numerical values/analog signal ranging from −1 (or 0) to 1: e.g., '−1' for indoor type and '1' for outdoor type) of all sub-classifier. Each sub-classifier evaluates an input image to determine if it is an indoor or outdoor image. Because of differences in the sub-classifiers and the feature types, each sub-classifier may have a different evaluation result from the other sub-classifiers. Accordingly, a final classifier is used to summarize/unify sub-classifiers' diverse evaluations. The final classifier can also be implemented using a neural network that is trained using the outputs from trained sub-classifiers and known image type.

Sub-classifier 1 is configured to compute a 2D color histogram in the CIELUV color space from the input image 106, and classify the input image 106 based on the 2D color histogram feature vector, according to one embodiment. To compute this image feature, the input image 106 is first divided into sub-blocks. In this embodiment, the input image 106 is divided into rectangular regions, for example, 32×24 regions; other embodiments can use a different number of regions. Average u and v values are calculated for each of the 32×24 regions based on the pixels contained within each region, as shown in Equations 1 and 2:

$$U(x_i, y_i) = (1/N_i) * \sum_{\substack{x_i-\Delta x \leq x \leq x_i+\Delta x \\ y_i-\Delta y \leq y \leq y_i+\Delta y}} u(x, y) \quad \text{Eqn. 1}$$

$$V(x_i, y_i) = (1/N_i) * \sum_{\substack{x_i-\Delta x \leq x \leq x_i+\Delta x \\ y_i-\Delta y \leq y \leq y_i+\Delta y}} v(x, y) \quad \text{Eqn. 2}$$

where u: image's u component (in LUV color space); v: image's v component; i: region index; U: regional average of u; V: regional average of v; $x_i$, $y_i$, a region's center pixel's location in an image; $\Delta x$, $\Delta y$: half region widths; and $N_i$: number of pixels in the region.

Then, a feature vector comprising a 2D color histogram can be formed by the 32×24 pairs of uv values. Each histogram bin records the number of regions exhibiting the same color as represented by the bin. Such a histogram can be calculated using Equation 3:

$$H_{uv}(u_j, v_j) = \\ \text{\# of regions with} \begin{cases} u_j - \Delta u \leq U(x_i, y_i) \leq u_j + \Delta u \\ \& \; v_j - \Delta v \leq V(x_i, y_i) \leq v_j + \Delta v \end{cases} \quad \text{Eqn. 3}$$

where j: histogram bin index; $H_{uv}$: 2D color histogram in uv space; ($u_j$, $v_j$): bin center position; and $\Delta u$, $\Delta v$: half bin width.

Sub-classifier 2 is configured to compute a 2D color-position histogram (composite) feature, and classify the input image 106 based on the calculated 2D color-position histogram. Such an image feature is color-position correlated. This feature vector is based on the hue value of the input image 106 pixels in HSV color space correlated to their spatial position in the input image 106. In this embodiment, the input image 106 is divided into rectangular regions, for example, 32×24 regions; other embodiments can use a different number of regions. Each 2D bin of the histogram corresponds to one of the 32×24 regions. The value of each bin represents the average hue value (or in some embodiments, the most dominant hue value), from all pixels within a corresponding region. This color-position feature vector can be calculated using Equation 4:

$$H_h(x_i, y_i) = (1/N_i) * \sum_{\substack{x_i-\Delta x \leq x \leq x_i+\Delta x \\ y_i-\Delta y \leq y \leq y_i+\Delta y}} h(x, y) \quad \text{Eqn. 4}$$

where $H_h$: 2D hue-position histogram (e.g., down-sampled hue image); h: image's hue component (in HSV color space); i: region/bin index; ($x_i$, $y_i$): regions center coordinates; $\Delta x$, $\Delta y$: half region widths; and $N_i$: number of pixels in the region.

Sub-classifier 3 is configured to compute a 2D histogram based on DCT coefficients from the input image 106, and classify the input image based on the 2D DCT coefficient histogram feature vector. The input image is divided into 16×12 rectangular regions. A corresponding 16×12 2D array of DCT coefficients is generated, where the value (count) in each bin is equal to the average of the absolute values of DCT coefficients within each region. Accordingly, the 2D histogram of DCT coefficients is a largely down-sampled image of the absolute-valued DCT image. Such a histogram can be calculated using Equation 5:

$$H_d(x_i, y_i) = (1/N_i) * \sum_{\substack{x_i-\Delta x \leq x \leq x_i+\Delta x \\ y_i-\Delta y \leq y \leq y_i+\Delta y}} |d(x, y)| \qquad \text{Eqn. 5}$$

where $H_d$: 2D DCT coefficient histogram (down-sampled DCT coefficient image); i: region/bin index; d: intensity image's DCT coefficient (same array size as the original image); $(x_i, y_i)$: region center coordinates; $\Delta x, \Delta y$: half region widths; and $N_i$: number of pixels in the region.

Sub-classifier 4 is configured to compute an image feature comprising a 1D entropy histogram of the input image's intensity, and classify the input image using this computed feature. Entropy, as used relative to sub-classifier 4, is a statistical measure of randomness that can be used to characterize the texture of the input image. To calculate this image feature, the intensity image of the input image is divided into rectangular regions, for example, 32×24 rectangular regions. An entropy value is then calculated for each region. Finally, the entropy values (e.g., 32×24) are counted and create a 1D histogram having a plurality of bins (e.g., 16 bins). Entropy of the input image intensity component can be calculated by Equation 6, and the entropy histogram can be calculated by Equation 7:

$$e(x_i, y_i) = -\sum_k H_{int}^i(k) * \log_2(H_{int}^i(k)) \qquad \text{Eqn. 6}$$

$H_e(e_j) =$ number of regions with $e_j - \Delta e \leq e(x_i, y_i) \leq e_j + \Delta e$     Eqn. 7 where $e(x_i, y_i)$: entropy of region i centered at $(x_i, y_i)$ calculated on intensity component of input image; i: region index; $H_{int}^i$: intensity histogram of region i; k: bin index; $H_e$: entropy histogram; $e_j$: bin center position; and $\Delta e$: half bin width.

Sub-classifier 5 is configured to compute a composite image feature which correlates a region's entropy with its color, and then use this feature to classify the input image. To calculate this entropy-color composite feature, the input image is divided into rectangular regions, for example, 32×24. The entropy of each region is computed in the same way as in sub-classifier 4 (Equations 6 and 7), and the average color of each region is calculated in the same way as in sub-classifier 1 (Equations 1 and 2). The color and entropy data is used to create a 2D histogram of entropy correlated with uv (color) components. The averaged uv values are considered as the coordinates on the uv color plane which is evenly divided into 16×12 2D bins. The value (count) at each bin position is the average value of the entropy of all regions whose averaged uv values fall into the range of the 2D bin, as illustrated by Equation 8:

$$H_{uv\_s}(u_j, v_j) = \begin{cases} 0, & \text{if no region exists with } \begin{cases} u_j - \Delta u < U(x_i, y_i) \leq u_j + \Delta u \\ \& \ v_j - \Delta v < V(x_i, y_i) \leq v_j + \Delta v \end{cases} \\ \dfrac{1}{N_j}, \sum\limits_{\text{all regions with } \begin{cases} u_j - \Delta u < U(x_i, y_i) \leq u_j + \Delta u \\ \& \ v_j - \Delta v < V(x_i, y_i) \leq v_j + \Delta v \end{cases}} e(x_i, y_i) \end{cases} \qquad \text{Eqn. 8}$$

where $e(x_i, y_i)$: entropy of region i centered at $(x_i, y_i)$ (calculated on intensity image as in Eqn. 6); i: region index; $H_{uv\_s}$: 2D color-entropy histogram; j: bin index; $(u_j, v_j)$: bin center position; $\Delta u, \Delta v$: half bin width; $N_j$: number of regions meeting the conditions $u_j - \Delta u < U(x_i, y_i) \leq u_j + \Delta u$ and $v_j - \Delta v < V(x_i, y_i) \leq v_j + \Delta v$; u: image's u component (in LUV color space); v: image's v component; U: regional average of u; V: regional average of v.

Sub-classifier 6 is configured to compute a composite image feature which is based on the orientation of edges in the input image, and then use this feature to classify the input image. For this sub-classifier, edge orientation can be derived from intensity image using a Sobel mask to determine edges based on intensity gradient. In the histogram, each bin represents an angular range, and each bin value records the number of pixels exhibiting edge orientation which falls in the bin range. The intensity gradient can be calculated using Equation 9, where a Sobel mask is depicted in Equation 10. The edge orientation and its histogram can be calculated using Equations 11 and 12, respectively.

$$I_{gx}(x, y) = I(x, y) * m'_{sob}, \ I_{gy}(x, y) = I(x, y) * m_{sob}, \qquad \text{Eqn. 9}$$

where $$m_{sob} = \begin{vmatrix} 1 & 2 & 1 \\ 0 & 0 & 0 \\ -1 & -2 & -1 \end{vmatrix} \qquad \text{Eqn. 10}$$

$$E(x, y) = \begin{cases} \text{not considered,} & \text{if } I_{gx} < I_{gth} \ \& \ I_{gy} < I_{gth} \\ \tan^{-1}\left(\dfrac{I_{gy}(x, y)}{I_{gx}(x, y)}\right), & \text{otherwise} \end{cases} \qquad \text{Eqn. 11}$$

$H_E(k) =$ number of pixels with $E_k - \Delta E < E(x, y) \leq E_k + \Delta E$     Eqn. 12

$I_{gx}$: edge gradient in x direction; $I_{gy}$: edge gradient in y direction; I: intensity image; $m_{sob}$: Sobel mask; *: spatial convolution; E: edge orientation (angle with respect to x-axis); $I_{gth}$: gradient threshold; $H_E$: histogram of edge orientation; k: bin index; $E_k$: bin center; $\Delta E$: half bin width Sub-classifier 7 is configured to compute a composite image feature which is based on the orientation of edges in the input image, and then use this feature to classify the input image. To compute this feature vector, the input image is first converted to an intensity image of the same size as the input image but having only the intensity component of the pixels. The intensity image is spatially filtered in the x-direction and y-direction to obtain horizontal and vertical edge gradient images, for example, in accordance with Equation 13. The spatial filtering can be performed using a Sobel mask, an example of which is provided in Equation 14. A thresholding operation is applied to the horizontal and vertical edge gradient images to allow consideration of only a portion of the edges, generally the prominent edges. The threshold value can be set as a constant that is chosen based on the edge statistics of a large number of images acquired from the related application field, e.g. DTV images or webcam images. The threshold value can also be set based on the input image's edge information. For example, in one embodiment the median value of the gradients is used as the threshold value. The ratio between vertical and horizontal images is computed as the slope of detected edges, which is converted to an angle with respect to the horizontal axis (orientation of edges) as illustrated in Equation 15. Then an entropy histogram is computed using Equation 12. Finally, one entropy value, $e_E$, is calculated based on the angle of the edges, as illustrated in Equation 16:

$$I_{gx}(x, y) = I(x, y) * m'_{sob}, \ I_{gy}(x, y) = I(x, y) * m_{sob}, \quad \text{Eqn. 13}$$

$$m_{sob} = \begin{vmatrix} 1 & 2 & 1 \\ 0 & 0 & 0 \\ -1 & -2 & -1 \end{vmatrix} \quad \text{Eqn. 14}$$

$$E(x, y) = \begin{cases} \text{not considered,} & \text{if } I_{gx} < I_{gth} \ \& \ I_{gy} < I_{gth} \\ \tan^{-1}\left(\dfrac{I_{gy}(x, y)}{I_{gx}(x, y)}\right), & \text{otherwise} \end{cases} \quad \text{Eqn. 15}$$

$$e_E = -\sum_k H_E(k) \cdot \log_2(H_E(k)) \quad \text{Eqn. 16}$$

where $I_{gx}$: edge gradient in x direction; $I_{gy}$: edge gradient in y direction; I: intensity image; $m_{sob}$: Sobel mask; *: spatial convolution; E: edge orientation (angle with respect to x-axis); $I_{gth}$: gradient threshold; $e_E$: entropy of edge orientation; $H_E(k)$: histogram of edge orientation, which equals the number of pixels with $E_k - \Delta E \leq E(x, y) \leq E_k + \Delta E$; k: bin index; $E_k$: bin center; and $\Delta E$: half bin width.

Each sub-classifier is trained and tuned individually using the same train image set as other sub-classifiers. After the training of all sub-classifiers is completed, the second stage is trained using the classification results produced by the first stage sub-classifiers, which have been trained, with the train image set. In the preferred embodiment of this invention, neural networks are used to properly model the complex statistical data with no prior knowledge. If the scene classifier is implemented using neural networks, the numbers of layers and neurons are selected according to classification accuracy and network complexity. In addition, the number of sub-classifiers (image features) in a scene classifier is dependent on the application problem and the computation capacity of the system.

An image library containing both indoor and outdoor images is used to train the indoor-outdoor scene classifier (the first scene classifier 102), while only outdoor images, labeled either natural or urban scene, are used to train the natural-urban scene classifier (the second scene classifier 104). To achieve optimized performance, all kinds of outdoor images (e.g., mountain, beach, house, city, etc) with variations (e.g., different sky color, different luminance, etc) need to be properly collected and present in the train image sets.

Figure 5:
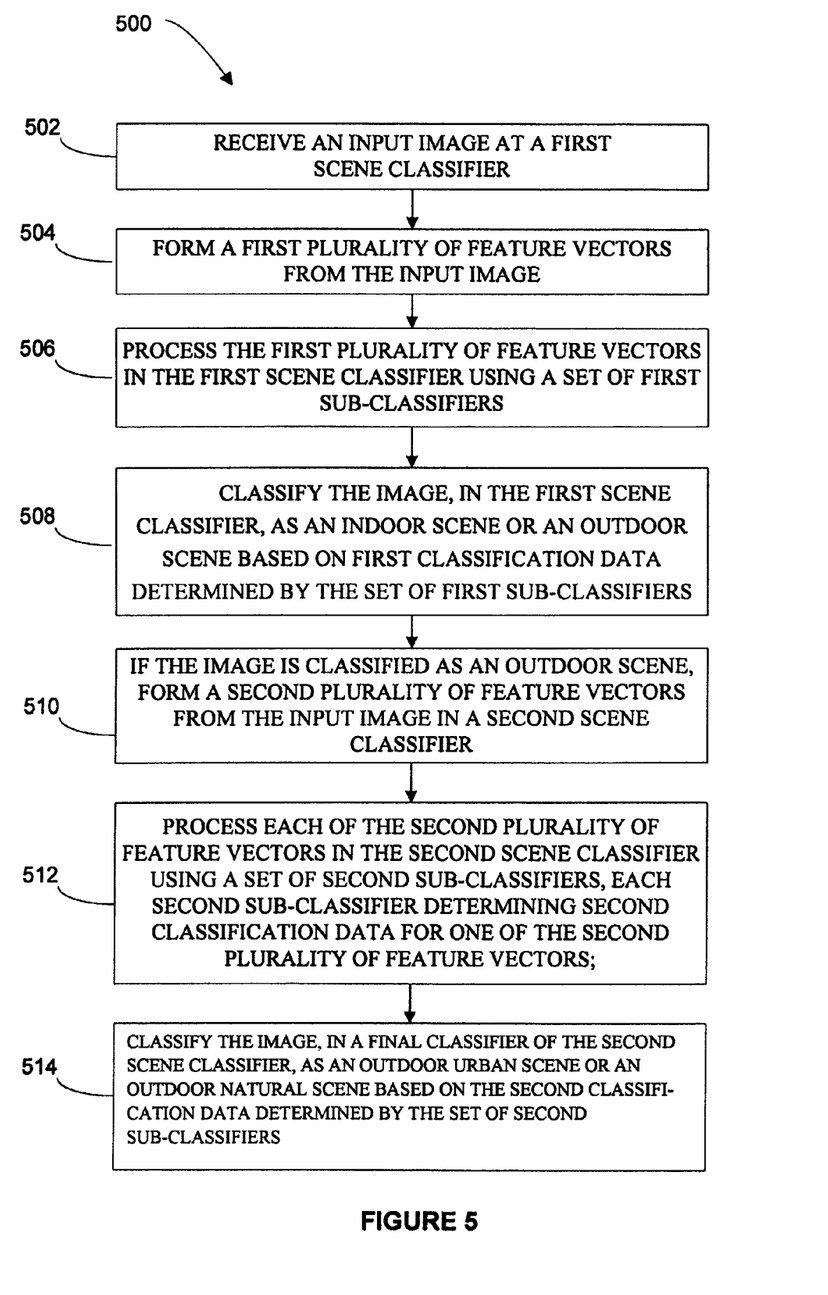
FIG. 5 is a flowchart illustrating a method of scene classification, according to one embodiment.

FIG. 5 is a flowchart illustrating a process 500 of scene classification, according to one embodiment. The process can be implemented on the scene classification system 100 illustrated in FIG. 1, specifically on the first scene classifier 102 and the second scene classifier 104 illustrated in FIGS. 2 and 3. In some embodiments the process 500 can be implemented on a scene classification system in a television or a video component which provides video data to a television, a monitor, or another display device.

At state 502 the process receives an input image. The first scene classifier 102 is configured to receive the input image. At state 504 the process forms a plurality of image features from the input image. The image features can include feature aspects relating to one or more of color, entropy, DCT coefficients, and edge orientation. Examples of such image features are described herein in association with sub-classifiers 1-7. The process 500, at state 506, processes the plurality of image features in the first scene classifier using a set of sub-classifiers and then a final classifier. Each sub-classifier determines a classification result from one of the plurality of image features. The final classifier determines the final classification result (the ultimate result of the first scene classifier) using the results produced by sub-classifiers. The sub-classifiers can be configured to operate in a parallel configuration and can be implemented in hardware, software, or a combination of hardware and software.

Still referring to FIG. 5, at state 508 the image is classified in the first scene classifier as either an indoor scene or an outdoor scene. This classification is based on the classification data determined by the set of sub-classifiers in the first stage of the first scene classifier and provided to the final classifier 218 in the second stage. If the scene is classified as an indoor scene, the scene classification process 500 can output a result to indicate the input image depicts an indoor scene. At state 510, if the image is classified as an outdoor scene, the plurality of image features obtained in the first scene classifier from the input image can be directly passed to the second scene classifier. In such case, although the same image features are used, the sub- and final classifiers in the second scene classifier can be configured differently than those in the first scene classifier to be able to differentiate the types of outdoor scenes (either urban or natural). In some embodiments, different or additional feature vectors will be calculated and processed in the second scene classifier.

At state 512, the second plurality of image features are processed by the second scene classifier using a set of second sub-classifiers in the first stage of the second scene classifier and a second final classifier in the second stage of the second scene classifier. Each of the second sub-classifiers determines second classification data for one of the second plurality of image features. Finally, at state 514 the process 500 classifies the input image, in the second scene classifier, as an outdoor urban scene or an outdoor natural scene based on the second final classification result produced by the final classifier in the second stage of the second scene classifier.

Figure 6:
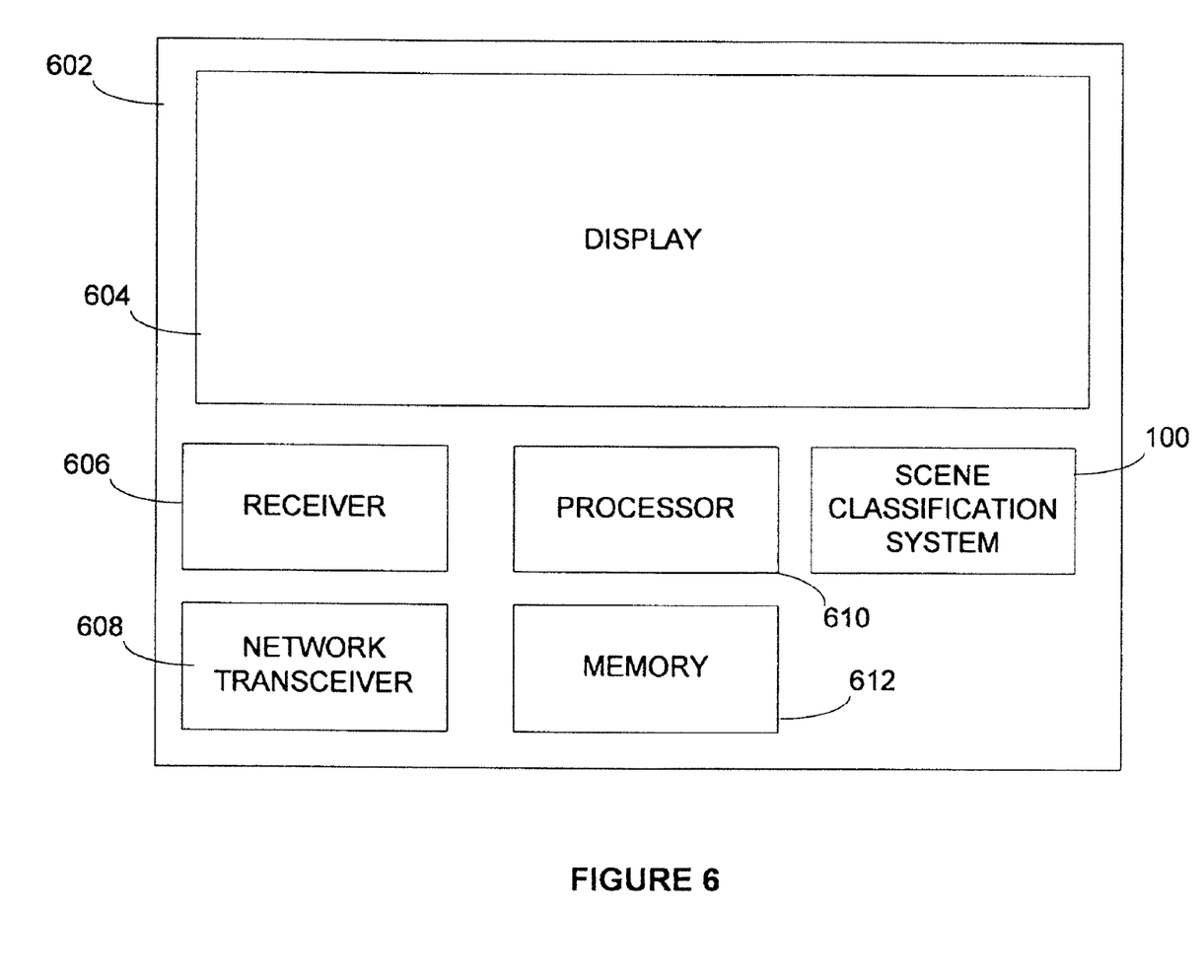
FIG. 6 is a schematic illustrating components of a television that can include a scene classification system, according to one embodiment.

FIG. 6 is a schematic illustrating components of a television 602 that can include a scene classification system, according to one embodiment. The television 602 includes a display 604 for displaying video data and a receiver 606 and a network transceiver 608 that can operate together to receive video from a content provider and provide video to the display 604. The television 602 can also include one or more processors 610 and memory 612 to store and process video data as needed. A scene classification system 100 can also be included in the television, operating as described herein to classify images (e.g., as indoor, outdoor urban, or outdoor natural). In other embodiments, the scene classification system can be included in a component separate from the television 602, for example, a cable TV access component, a satellite TV access component, or a separate component connected in-line with a video content provider or other video providing equipment (e.g., a DVD player).

The embodiments of the invention can be implemented in classifiers configured with neural networks to process the image features. In one embodiment, the system is composed of at least two neural networks, one for each scene classifier. A neural network, at least in theory, is configured to be representative of the functioning of the brain. For example, the brain is composed of neurons connected by synapses. Some neural paths achieve better results than others do. A neural network represents neurons as nodes. Nodes are then connected by pathways with given weights. Those paths yielding significant outputs are weighted more heavily than those paths with no or a negative impact on the output. For more detail on neural networks generally, see U.S. Pat. No. 5,857,177 "Neural networks."

Figure 7:
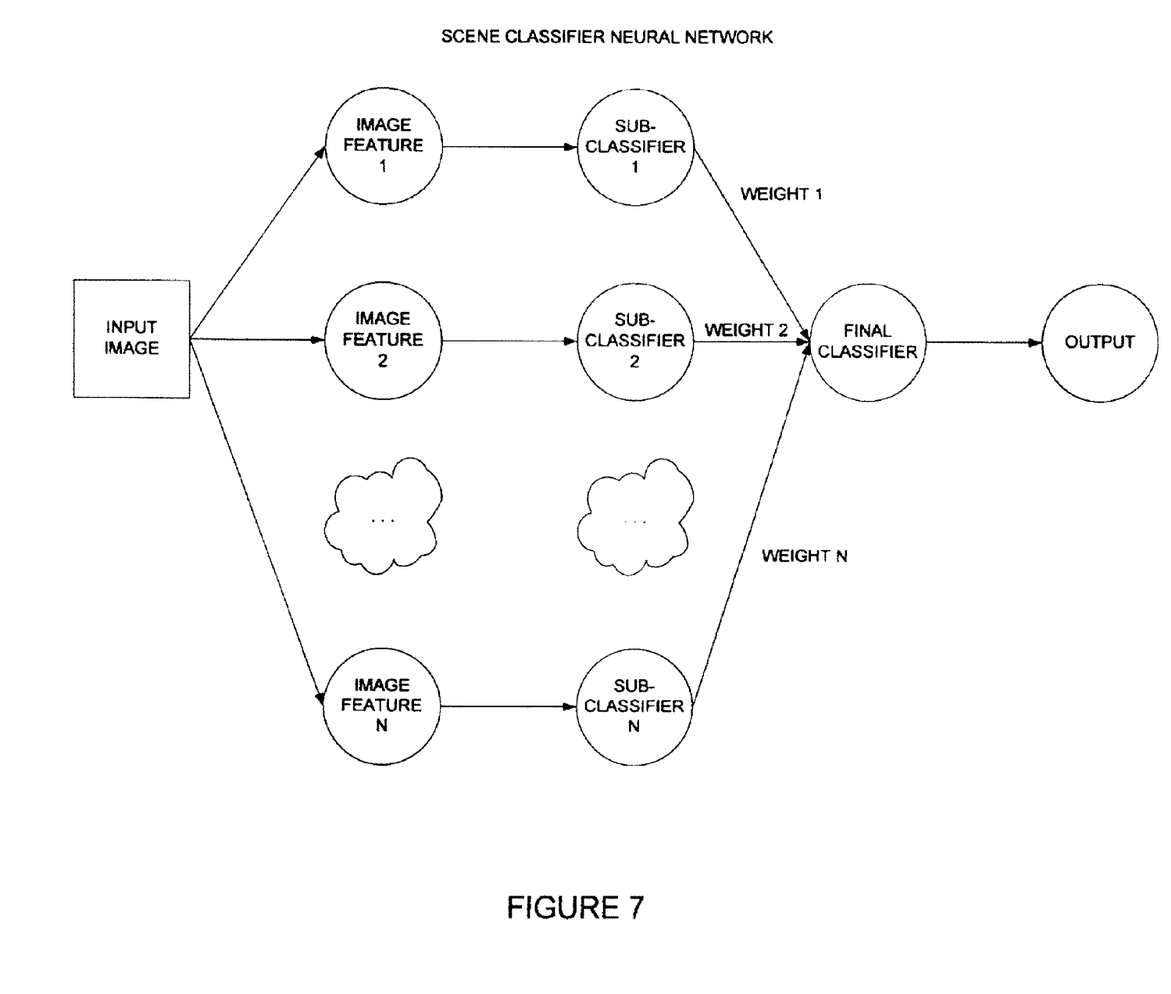
FIG. 7 is a flowchart illustrating a neural network for scene classification.
Figure 8:
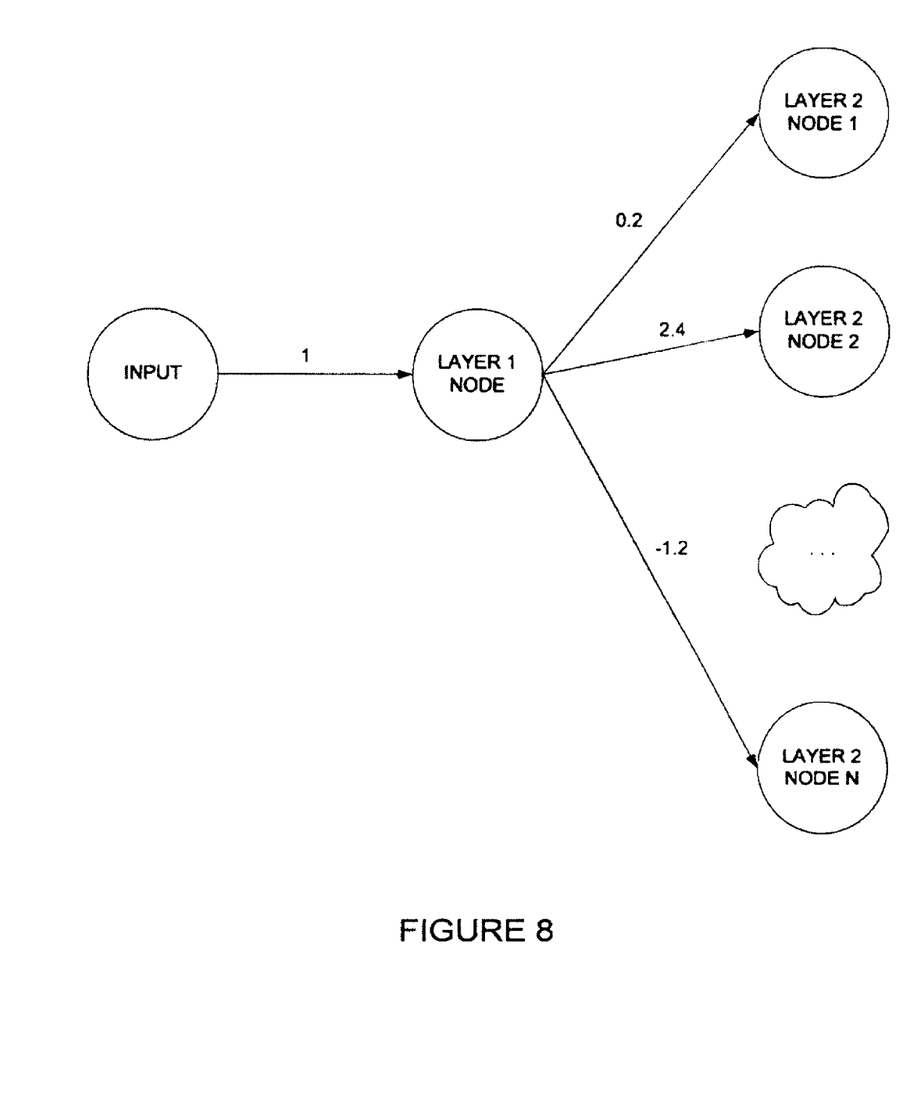
FIG. 8 is a flowchart illustrating a neural network classifier.

One type of neural network is a feed-forward network. In a feed-forward network, the most basic embodiment of the current invention, one or more inputs are passed into the neural network. In one embodiment, the initial inputs can be image features or the result of previous classifiers. FIG. 7 illustrates a feed-forward network where each sub-classifier accepts an image feature as an input, where each image feature is determined for a particular sub-classifier that uses the image feature. Once inside the neural network, the inputs to a given node are the outputs sum of the weighted inputs plus a bias. FIG. 7 generally illustrates the weighted pathways between the sub-classifiers and final classifier. FIG. 8 shows a more detailed view of how weights can be assigned to pathways between nodes to promote significant pathways, such as the pathway with a weight of 2.4, and de-emphasize insignificant or detrimental pathways, such as the pathways with weights of 0.2, and −1.2, respectively.

Figure 9:
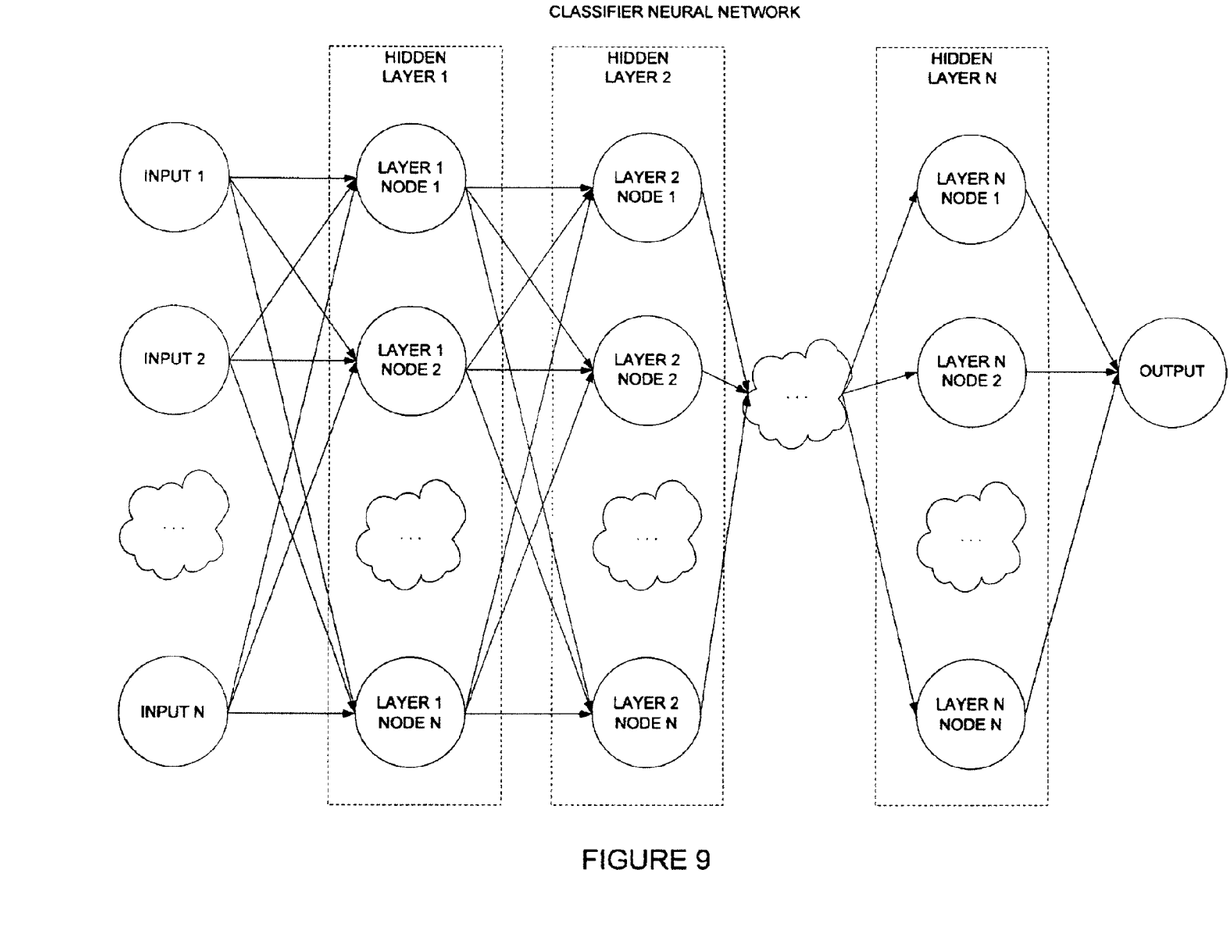
FIG. 9 is a flowchart illustrating a portion of a neural network with sample weights assigned to the pathways between nodes.

The network distributes the initial inputs to nodes of a first hidden layer, embodied in the current invention as a series of sub-classifiers. Based on the inputs, but not solely the input, each node will generate an output value, typically between 0 and 1 (or between −1 and 1). This output value may then be transmitted to one or more nodes in next layer. FIG. 9 illustrates the transmission of results from node to node also from layer to layer through the neural network. Nodes within a network are often called "hidden nodes" or grouped into "hidden layers." In one embodiment, as shown in FIG. 7, the second stage, the final classifier can serve as a "second" hidden layer with all the inputs from the previous layer (sub-classifiers). Within a sub-classifier, there may be more than one hidden layers. The final classifier then reports a final response, for example, a numerical value which represents the classification of the image.

The final classifier or each sub-classifier node can itself be a neural network trained to accept inputs and output a classification value for use later on in the network or other processes. Within each of the sub-classifier networks, some inputs may have greater weight than others in arriving at an output, as is shown in FIG. 8. FIG. 8 illustrates a portion of an embodiment of a neural network showing a limited number of nodes and layers, all pathways between nodes in the network have assigned weights. In some embodiments, some inputs may also have no weight in the output (are not considered).

Neural networks may classify received data based on the weights of each path. In "static" embodiments of a classification system, the weights can be predetermined and assigned to the output of each classifier ahead of time. In such embodiments, the values of the weights can be predetermined (and assigned) by classifying a training set of images containing known subject matter prior to using the neural network for its intended application. In "dynamic" embodiments of a classification system, one or more of the weights may be determined through training, and also may be revised while the system is being used. Training a neural network involves deriving the proper weights for the connections between nodes that yield the expected result for a known set of data. For example, by classifying a sample set of images each with a known containing known subject matter, the weights of a classifier can be adjusted until the neural network achieves the best results based on the training set. When the neural network is used for its particular application, the weights may be adjusted to take into account results of classifying "new" images. Input regarding the results of the classification may be used to determine if the weights should be adjusted. In some embodiments, another classification process may be used to provide input regarding the results of the classifier and may be used to adjust the weights of the neural network (for example, an automatic classifier process or a user). A variety of training mechanisms are available to train a neural network, for example, U.S. Pat. No. 6,128,609 "Training a neural network using differential input," U.S. Pat. No. 4,912,652 "Fast neural network training," and U.S. Pat. No. 5,555,345 "Learning method of neural network."

Feed-forward neural networks are not the only type of neural networks. Other neural network types include radial basis function networks, Kohonen self-organizing networks (self-organizing map), recurrent neural networks, stochastic neural networks, modular neural networks, holographic associative memory networks, instantaneously trained networks, spiking neural networks, dynamic neural networks, cascading neural networks, neuro-fuzzy networks, compositional pattern-producing networks, and one-shot associative memory networks.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software executed by one or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of classifying a scene depicted in an digital image, the method comprising:
   receiving an input image in a first scene classifier;
   deriving a first image feature based on calculating an average color value of each of a plurality of a region of the input image, and forming a color histogram;
   deriving a second image feature based on calculating an average hue value of each of the plurality of the region of the input image, and forming a color-position histogram; and
   classifying the input image as an indoor scene or an outdoor scene based on the color histogram, the color-position histogram, or combination thereof for displaying on a device.

2. The method of claim 1, wherein the first image feature is in an LUV color space.

3. The method of claim 1, wherein the second image feature is in a HSV color space.

4. The method of claim 1, further comprising deriving a third image feature based on a DCT coefficient.

5. The method of claim 1, further comprising forming a third image feature based on dividing an intensity component of the input image into a plurality of a region.

6. A system for classifying a scene depicted in a digital image, the system comprising:
   a processor is configured to receive an input image in a first scene classifier;
   a memory having code executable by the processor is configured to:
      derive a first plurality of an image feature from the input image;
      derive a first feature based on calculating an average color value of each of a plurality of a region of the input image, and forming a color histogram;
      derive a second image feature based on calculating an average hue value of each of the plurality of the region of the input image, and forming a color-position histogram;
      process the first plurality of the image feature in a color position histogram in the first scene classifier; and
      classify the input image as an indoor scene or an outdoor scene based on the color histogram, the color-position histogram, or combination thereof for displaying on a device.

7. The system of claim 6, wherein one of the plurality of the image feature includes a histogram of edge orientations.

8. The system of claim 6 wherein one of the plurality of the image feature includes an entropy of the edge orientations.

9. The system of claim 6 wherein the processor is configured to determine a joint user profile for personalizing a multimedia experience.

10. The system of claim 6 wherein the processor is configured to derive a second plurality of the image features from the input image in a second scene classifier comprises obtaining the first plurality of the image feature from the first scene classifier.

11. The system of claim 6, wherein the first plurality of the image feature comprises at least one of a same set of image features as a second plurality of the image feature.

12. The system of claim 6, wherein the plurality of the image feature are each based on feature information contained in pixels of the input image, comprising at least one of a color, an entropy, an edge, and discrete cosine transform (DCT) information.

13. The system of claim 6, wherein forming a second plurality of the image feature from the input image in the second scene classifier comprises obtaining the first plurality of the image features from the first scene classifier.

14. The system of claim 6, wherein the processor is configured to form a third image feature based on dividing an intensity component of the input image into a plurality of a region.

* * * * *